(12) United States Patent
Moravec et al.

(10) Patent No.: US 7,536,048 B2
(45) Date of Patent: May 19, 2009

(54) METHOD AND APPARATUS FOR AUTOMATICALLY DETERMINING IMAGE FOREGROUND COLOR

(75) Inventors: Kimberly Moravec, St. Bernard du Touvet (FR); Christopher R. Dance, La Terrasse (FR)

(73) Assignee: Xerox Corporation, Norwalk, CT (US)

( * ) Notice: Subject to any disclaimer, the term of this patent is extended or adjusted under 35 U.S.C. 154(b) by 897 days.

(21) Appl. No.: 10/757,490

(22) Filed: Jan. 15, 2004

(65) Prior Publication Data

US 2005/0157926 A1    Jul. 21, 2005

(51) Int. Cl.
*G06K 9/00* (2006.01)
*G06K 9/34* (2006.01)
*G09G 5/02* (2006.01)
*H04N 1/40* (2006.01)
*G03F 3/08* (2006.01)

(52) U.S. Cl. ........... 382/164; 382/171; 382/173; 382/176; 345/589; 358/2.1; 358/518

(58) Field of Classification Search ......... 382/162–168, 382/112–113, 170–180, 224–228; 356/2.1, 356/518–523; 345/589–605
See application file for complete search history.

(56) References Cited

U.S. PATENT DOCUMENTS

| | | | | |
|---|---|---|---|---|
| 5,335,292 A | * | 8/1994 | Lovelady et al. | 382/163 |
| 5,383,036 A | * | 1/1995 | Mailloux et al. | 358/518 |
| 5,424,945 A | | 6/1995 | Bell | 364/419.2 |
| 5,473,738 A | * | 12/1995 | Hamlin et al. | 345/594 |
| 5,508,718 A | | 4/1996 | Haikin | 345/150 |
| 5,615,320 A | | 3/1997 | Lavendel | 395/131 |
| 5,767,978 A | * | 6/1998 | Revankar et al. | 358/296 |
| 5,889,932 A | | 3/1999 | Adegeest et al. | 395/117 |
| 5,900,953 A | * | 5/1999 | Bottou et al. | 358/540 |
| 5,909,220 A | * | 6/1999 | Sandow | 345/589 |
| 6,148,102 A | * | 11/2000 | Stolin | 382/164 |
| 6,381,363 B1 | * | 4/2002 | Murching et al. | 382/164 |
| 6,414,690 B1 | * | 7/2002 | Balasubramanian et al. | 345/589 |
| 6,606,408 B1 | * | 8/2003 | Kang et al. | 382/164 |

(Continued)

FOREIGN PATENT DOCUMENTS

JP    01 025285 A    1/1989

(Continued)

OTHER PUBLICATIONS

Ping Guo and Michael R. Lyu, "A Study on Color Space Selection for Determining Image Segmentation and Region Number", Proceedings of the international Conference on Artificial Intelligence, IC-AI 2000, CSREA Press, Athens, GA, USA, vol. 3, pp. 1127-1132, Jun. 2000.*

(Continued)

*Primary Examiner*—Matthew C Bella
*Assistant Examiner*—Manav Seth
(74) *Attorney, Agent, or Firm*—Fay Sharpe LLP

(57) ABSTRACT

A foreground color for a digital image is automatically determined by dividing the colors of the pixels of at least a part of the digital image into a number of color clusters in a color space, and for at least one cluster selecting a color being related to the at least one color cluster according to predetermined criteria.

23 Claims, 6 Drawing Sheets

U.S. PATENT DOCUMENTS

| | | | |
|---|---|---|---|
| 6,721,448 B2* | 4/2004 | Rao et al. | 382/164 |
| 6,788,308 B2* | 9/2004 | Reavy et al. | 345/617 |
| 2001/0049591 A1 | 12/2001 | Brunt et al. | 703/1 |
| 2002/0027561 A1* | 3/2002 | Wu | 345/593 |
| 2002/0146167 A1* | 10/2002 | Imamura et al. | 382/164 |

FOREIGN PATENT DOCUMENTS

| | | |
|---|---|---|
| JP | 2002 158880 A | 5/2002 |

OTHER PUBLICATIONS

J. You, E. Pissaloux, H. A. Cohen, "A Hierarchical Image Matching Scheme Based on the Dynamic Detection of Interesting Points", International Conference on Speech and Image Processing, 1995, vol. 4, pp. 2467-2470.*

Jianbo Shi and Jitendra Malik, "Normalized Cuts and Image Segmentation", 2000, IEEE Transactions on Pattern Analysis and Machine Intelligence, vol. 22, No. 8, pp. 888-905.*

Daniel Gatica-Perez, Zhi Zhou, Ming-Ting Sun and Vincent Hsu, "Video Object Hyper-Links for Streaming Applications", 2002, Springer-Verlag Berlin Heidelberg, Visual 2002, LNCS 2314, pp. 229-238.*

Antonio J. Colmenarez and Thomas S. Huang, "Face Detection With Information-Based Maximum Discrimination", 1997, IEEE, pp. 782-787.*

P. K. Sahoo, S. Soltani, A. K. C. Wong and Y. C. Chen, "A Survey of Thresholding Techniques", 1988, Computer Vision, Graphics and Image Processing, vol. 41, pp. 233-260.*

Gio, Ping and Lyu, Michael R. "A Study on Color Space Selection for Determining Image Segmentation Region Number," Proceedings of the International Conference on Artificial Intelligence, IC-AI'2000, CSREA Press, Athens, GA, USA, vol. 3, pp. 1127-1132, Jun. 2000.

European Search Report for EPO counterpart application No. EP 05 10 0243, Mar. 30, 2005.

Yuri Boykov, Olga Veksler, Ramin Zabih, "Fast Approximate Energy Minimization via Graph Cuts", IEEE transactions on Pattern Analysis and Machine Intelligence (PAMI), vol. 23, No. 11, pp. 1222-1239, 2001.

K.S. Fu and J.K. Mui, "A Survey On Image Segmentation", Pattern Recognition, vol. 13, pp. 3-16, 1981.

R.M. Haralick, "Image Segmentation Survey", in Fundamentals in Compu 1983ter Vision, O. D. Faugeras (ed.), pp. 209-224, Cambridge University Press, Cambridge, 1983.

R.M. Haralick and L.G. Shapiro, "Survey—Image Segmentation Techniques", Computer Vision Graphics and Image Processing, vol. 29, pp. 100-132, 1985.

N.R. Pal and S.K. Pal, "A Review On Image Segmentation Techniques", Pattern Recognition, vol. 26, pp. 1277-1294, 1993.

P.K. Sahoo, S. Soltani, A.K.C. Wong and Y.C. Chen, "A Survey Of Thresholding Techniques", Computer Vision, Graphics and Image Processing, vol. 41, pp. 233-260, 1988.

J. Shi and J. Malik, "Normalized Cuts and Image Segmentation", IEEE Transactions on Pattern Analysis and Machine Intelligence vol. 22, pp. 888-905, 2000.

U.S. Appl. No. 10/880,688, entitled "System And Method For Measuring And Quantizing Document Quality", filed Jun. 30, 2004, which claims priority from U.S. Appl. No. 60/491,043, filed Jul. 30, 2003, and from U.S. Appl. No. 60/491,042, filed Jul. 30, 2003.

U.S. Appl. No. 10/881,188, entitled "System And Method For Measuring And Quantizing Document Quality", filed Jun. 30, 2004, which claims priority from U.S. Appl. No. 60/491,043, filed Jul. 30, 2003, and from U.S. Appl. No. 60/491,042, filed 30, 2003.

* cited by examiner

METHOD AND APPARATUS FOR AUTOMATICALLY DETERMINING IMAGE FOREGROUND COLOR

BACKGROUND OF INVENTION

The invention is directed to a method for automatically determining a foreground color for a digital image, in particular, for placing a text or graphic object against a background image.

In many different areas, a text or a graphic object is combined with an image to be displayed together. In these cases, usually the text or the graphic object constitutes a foreground object whereas the image is the background. A combination of the text and image is used, for example, for esthetical reasons or to illustrate the text by means of the background image.

A graphic designer is often confronted with the task of adding a foreground text object to a given background image in such a way that the text is clearly legible. In such a case, the selection of a suitable color poses a problem due to the usually large number of possible and available colors for the text object.

Furthermore, a combination of a text object with a background image is encountered on many web pages where the text is provided on a colored background. However, web pages are to be displayed on a variety of different devices such as different types of computer monitors or of handhelds or mobile phones. Depending on the capabilities of the device or the graphic card, the text and the background image are displayed differently. In particular, a designer cannot exclude that in some cases, the text and the background image are displayed in such a way that the color of the text and the color or colors of the background image are almost the same which makes it difficult to read the text.

Methods for selecting a color are known from different fields. For example, U.S. Pat. No. 5,508,718 discloses a computerized color selection system which selects colors based on a user's designation of color impact objectives which specify how colors affect those who view the colors rather than specifying the colors themselves. Other methods for color selection or for evaluating graphical data are known, for example, from U.S. Pat. Nos. 5,889,932, 5,424,945, 5,909,220, and 5,615,320, and U.S. Patent Publication 2001/0049591 A1.

Notwithstanding these advances in color selection, there continues to exist a need for automatically determining a foreground color for a given background image. It would also be desirable that such a method for automatically determining a foreground color for a digital image allows an improved representation of a text or graphic object against an image background.

SUMMARY OF INVENTION

In accordance with the invention, there is provided an apparatus, method and article of manufacture therefor, for automatically determining a foreground color for a digital image. The apparatus includes a color clustering module and a color selection module. The color clustering module automatically divides the colors of the pixels of at least a part of the digital image into a number of color clusters in a color space. The color selection module automatically selects for at least one color cluster, a color that is related to the at least one color cluster according to predetermined criteria. Examples of digital images include pictures and photographs, as well as colored background images.

In accordance with one aspect of the invention, the color clustering module is adapted to analyze a digital image in color spaces, such as RGB, HSL, or L*a*b*, to identify colors that dominate the digital image. In accordance with another aspect of the invention, the color selection module provides a "candidate" color or recommended color depending on the dominant colors identified by the color clustering module.

In accordance with yet another aspect of the invention, the color selected by the color selection module, for the at least one color cluster, has certain relationships to specific predetermined criteria in that it may be "close" in some respects and "different" in other respects. The predetermined criteria are responsible for the way the selected color differs from the color cluster. For example, the criteria can be based on a predetermined legibility criterion of the selected color with respect to the cluster in color space.

Advantageously, the method may be adapted to bring about a well designed (i.e., esthetically pleasing), legible document, for example, with a foreground text or graphics object in the selected color. Thus, in particular, for a specific display device, the method may be adapted to automatically determine a suitable foreground color for a graphics or text object depending on how a foreground object and a digital background image would be displayed on the device.

According to various embodiments of the invention, the color clustering module converts image data of the digital image to a predetermined color format. The image data are the color values of the pixels of the digital image. In this way, the color format or the color space can be chosen in a suitable way depending on the further processing of the data, in particular, depending on the predetermined criteria for selecting a color.

According to various embodiments of the invention, the color clustering module divides the colors of the pixels into clusters in a color space in one of a plurality of ways that includes using an Expectation-Maximization clustering, which yields an advantageous implementation for a predetermined number of clusters.

According to various embodiments of the invention, the color clustering module determines the number of clusters using a model selection method. In particular, the model selection methods can comprise determining the number of clusters using a Bayesian Information Criterion or a Universal Model-based Minimum Description Length Principle. In this way, the number of clusters into which the colors of the pixels are divided need not be known in advance and can be determined for each case separately. However, it is also possible that a user determines the number of clusters or alternatively the number of clusters may be a predefined fixed number of clusters.

In accordance with yet a further aspect of the invention, color selection may be preceded by image segmentation, which involves automatically segmenting part of the digital image into regions according to the color clusters. Advantageously image segmentation (performed by an image segmentation module) provides that the areas of the digital image are assigned cluster labels corresponding to the color clusters in order to determine the local colors of the image.

According to various embodiments of the invention, image segmentation is performed using a normalized cut criterion or an energy-minimization method. In this way, image segmentation can be performed using a method that is adapted for the images to be processed and/or the processing device.

According to various embodiments of the invention, the image segmentation module groups the color clusters output by the color clustering module into interference clusters comprising a pixel in a selected region and benign clusters comprising no pixel in the selected region, and selecting a color being related to all interference clusters according to predetermined criteria. Advantageously, image segmentation provides that when the color selection module automatically selects a color, all clusters are taken into account which have regions that overlap with the selected region (where the foreground text or graphic object is to be placed).

According to various embodiments of the invention, a color can be selected by the color selection module according to a legibility criterion for a predetermined foreground region. A legibility criterion indicates how well a text is legible. This enables the placement of a foreground region having improved legibility against a given background image.

According to various embodiments of the invention, a color can be selected based on a likelihood ratio of the hypothesis that the digital image contains the foreground region and the hypothesis that the digital image does not contain the foreground region. In these embodiments, the legibility criterion is based on the score for these two models that the image contains text and that the image just contains background.

According to various embodiments of the invention, selecting a color according to a legibility criterion includes computing local measures of contrast between background and foreground in a neighborhood of a candidate region of the background image, and computing a value that is representative of the lowest few contrast values observed over the candidate region. In one embodiment, the legibility score can comprise maximizing the legibility $$\min_{x \in T} \max_{y \in C_\varepsilon^2} r(x+y),$$

wherein $$r(x) = \log \frac{Pr(I(x)|T)}{Pr(I(x)|B)}, C_\varepsilon^2$$

is a disc of radius $\varepsilon$, and wherein $Pr(I(x)|T)$ denotes heuristic or other models of likelihoods that the image I contains text T at a given pixel x and $Pr(I(x)|B)$ denotes heuristic or other models of likelihoods that the image I contains background B at the given pixel x.

According to various embodiments of the invention, a color can be selected according to a color harmony criterion. Selecting a color according to a color harmony criterion can be performed alternatively or additionally to a legibility criterion.

In particular, a color can be selected according to at least one of a monotonic, a complementary, and a p-adic color harmony criterion in HSL space. A monotonic color harmony is present if there is a small distance (approximately 0°) between two colors in hue. A complementary hue is given by two colors having a hue which is about 180° apart in HSL space. By dividing the hue in HSL space into p equal or nearly equal increments over a range of 360°, a p-adic (e.g., triadic, quadric, etc.) color harmony is obtained. According to a further embodiment, a color can be selected according to a color harmony criterion with respect to at least one interference cluster and/or one benign cluster.

According to various embodiments of the invention, the color selection module determines a color subset according to a color harmony criterion and maximizes a legibility function in the color subset. In this way, a color harmony criterion and a legibility criterion are combined. Advantageously, determining a subset based on a color harmony criterion reduces the number of possible colors for which the legibility criterion is maximized. In particular, determining a color subset can comprise sub-sampling the color subset.

According to various embodiments of the invention, a color c can be selected using a linear design function for which $$\sum_{i=1}^{M} \alpha_i l(c, P_i) + \sum_{k=1}^{N} \gamma_k h(c, K_k)$$

is maximal, wherein $P_i$ denote the interference clusters, $K_k$ denote all clusters, both benign and interference, l is a legibility function in color space, h is a color harmony function, and $\alpha_i$, and $\gamma_k$ are weighting factors.

The legibility function can have different forms; for example, it can represent the standard Euclidean distance in color space. As an alternative, the luminance coordinate can be weighted higher than the other coordinates. According to a further embodiment, the legibility function can correspond to a legibility criterion as described above. The design function can represent a color harmony criterion as mentioned above or other design principles, for example, such that the distance of the resulting color to one of the benign clusters is small.

According to various embodiments of the invention, the above-described methods can further comprise displaying or storing a predetermined graphic or text object using the selected color together with the digital image. In this way, a combined image is obtained, wherein the graphic object or text object in the foreground has a color being optimized with respect to legibility against the background image.

In accordance with a further aspect of the invention, there is provided a method for determining legibility of an image having an identified foreground and background. The method includes computing local measures of contrast between background and foreground in a neighborhood for a predetermined foreground region of the image, and computing a legibility score representative of a lowest few contrast values observed over the predetermined foreground region.

BRIEF DESCRIPTION OF DRAWINGS

These and other aspects of the invention will become apparent from the following description read in conjunction with the accompanying drawings wherein the same reference numerals have been applied to like parts, and in which.

DETAILED DESCRIPTION

A. Methods For Determining Foreground Color

Figure 1:
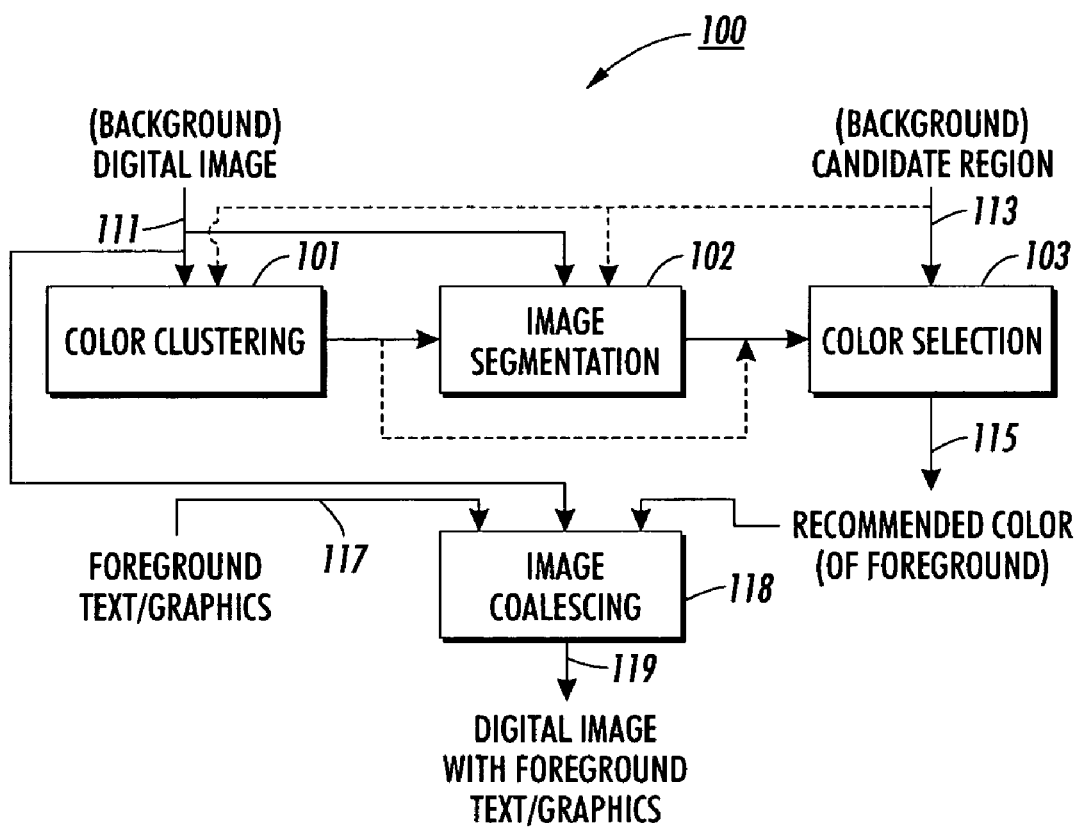
FIG. 1 illustrates elements of an example system for automatically determining a foreground color according to the invention.

FIG. 1 illustrates elements of an example of a system 100 for performing a method for automatically determining a foreground color. The system 100 comprises a color clustering module 101, a (optional) color segmentation module 102, and a color selection module 103. A digital image 111 is input to the color clustering module 101 and the color segmentation module 102. This digital image 111 is intended as the background image. It is the aim to present a (predetermined) foreground text or graphic object against this background image in a selected region of the background image. The foreground color to be determined for the foreground text or graphics object depends on the region of the image where the text or graphic is to be placed. In view of this, a selected region (also called a candidate region) 113 is to be provided.

In the example shown in FIG. 1, this candidate region 113 is provided to the color selection module 103. The region 113 can be provided by a user via a suitable interface. For example, the digital image 111 can be displayed on a monitor and a user can select a region 113 using a cursor or mouse pointer. Alternatively, the candidate region 113 can be selected automatically using appropriate image processing methods with appropriate criteria.

Instead of the case illustrated in FIG. 1, it is also possible to provide a pre-selected candidate region 113 to the color clustering module 101. This is particularly useful if color clustering, color segmentation and color selection are not performed for the whole image but only for the part of the image, for example, consisting of the selected region or a larger area comprising the selected region.

Upon completing color selection for the digital image, the recommended color or colors output at 115 for the foreground text or graphics object input at 117 intended to be placed on the background image 111 may be combined or overlaid by image coalescing module 118 and output (or simply provided as a recommendation) at 119. It is to be understood that more than one text or graphic object can be placed against the background of a digital image 111. In such a case, more than one candidate region 113 is to be provided resulting in a recommended color for each candidate region.

It will be appreciated that the method according to the invention and the exemplary system shown in FIG. 1 can be used in various environments. In particular, it can be used for recommending different foreground colors when presenting a web page on different display devices. Many web pages are designed with elements where a text is placed over a photograph or another colored background. Doing such design automatically without the benefit of foreground recommendations provided by the invention, creates a risk that a color and/or a placement would be chosen such that the text is not legible or that colors would be chosen that do not coordinate with the overall color scheme of the image.

Such a color foreground selection problem particularly arises if a corresponding web page is displayed on a device having a different color resolution or a different display area than expected by the web designer (for example when displaying on a mobile phone or a personal digital assistant (PDA)). In such situations, the web page is actually displayed with different colors or with the image scaled to a certain dimension. In the event, the web designer saves the text or graphic object together with the background image in a single bitmap file, a scaling or displaying with different colors (depending on the display device) could render the page illegible. Thus depending on expected display conditions, it would be advantageous to provide the background image and the foreground object separately such that an appropriate color for the foreground image can be determined that is adapted to the display conditions using the method according to the invention. Such an adaption, including providing a recommended color, could be performed on the web server (after having received the display characteristics of the display device) or by the display device (such as a mobile phone or a PDA) itself.

Another environment in which the present invention may be advantageously used is within the context of automated document layout (ADL). By providing an ADL system with the ability to combine images with graphics and text in an appropriate way increases the range and the quality of documents that can be produced. In one embodiment, such an ADL program which automatically places text or graphics on images can be implemented within a graphic art editing program that provides foreground color recommendations in accordance with the invention.

Furthermore, a color matching method and system 100 as described herein can be used as a design aid for modifying an existing environment with a new element. For instance, the system 100 may be adapted to provide recommendations for a user that wishes to add a sign to a storefront or choose the color of a rug to complement existing furniture. In such a case, the user would take a photograph of the scene, upload it into the computer, analyze the image using the method according to the invention and even see the resulting image modified with the new element.

Figure 2:
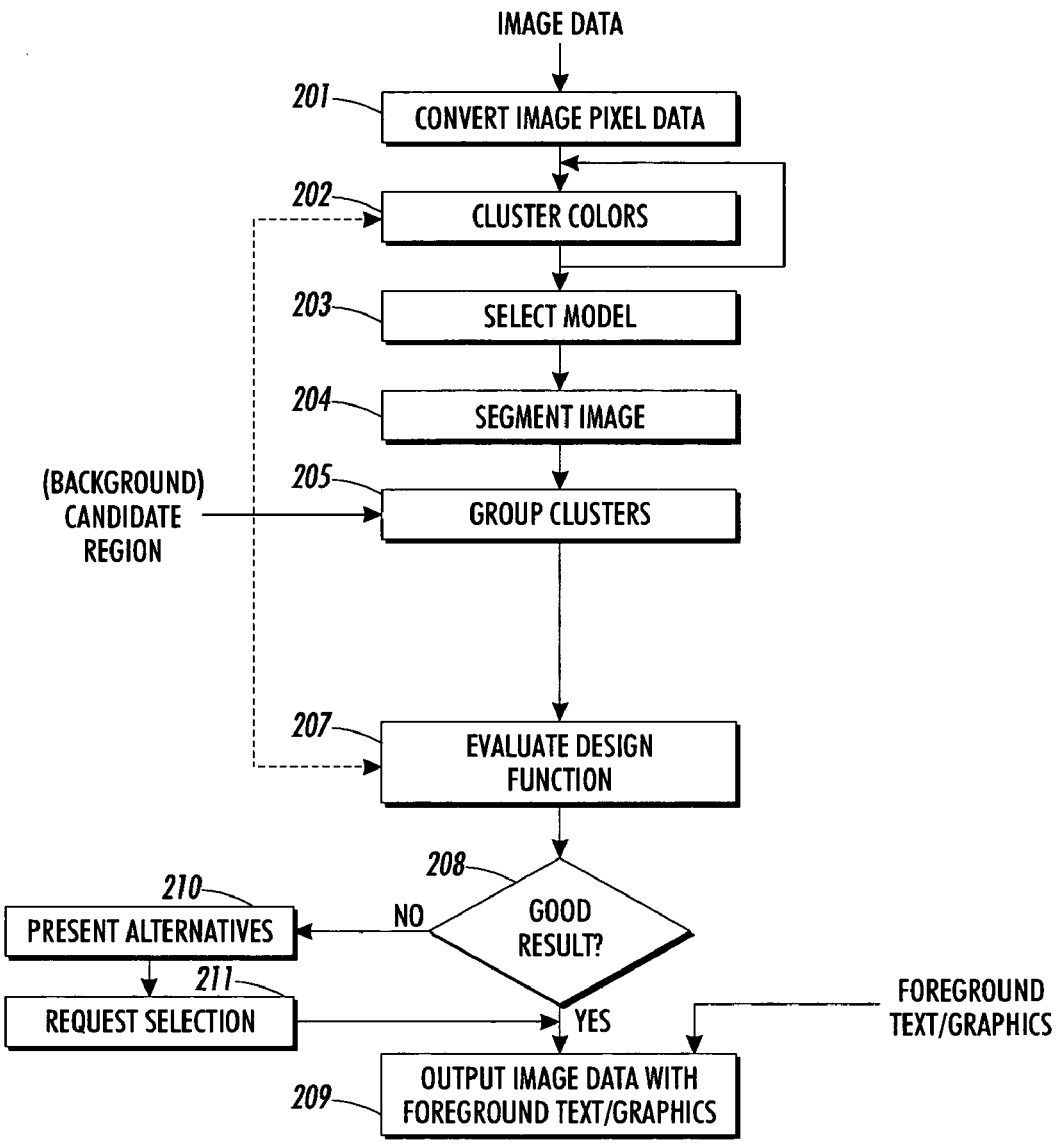
FIG. 2 is a flow diagram illustrating an example of a method for automatically determining a foreground color according to the invention.

A flow diagram illustrating an example of a method according to the invention is shown in FIG. 2. Initially, a digital image 111 is provided to the corresponding system 100.

At step 201, the image data (the color values of the image pixels) is converted to a predetermined color format. Many color formats or color spaces are possible, for example, RGB, HSL, L*a*b*, etc.). RGB is a common color representation for computers and HSL is commonly used in graphic arts. Another alternative is the L*a*b* which is based on the physiology of human color perception where the distance corresponds to human color discrimination. Depending on the intended use of the foreground object with the background image, different color spaces can be appropriate.

At step 202, the colors of the formatted image data are clustered into a small number of groups or labels in order to determine the dominant colors of the overall document (digital image). In many cases, for example, if the background image is a photograph, the image may contain many colors related in a complex way. Such a phenomenon can arise for several reasons. Textures often contain many colors. Shading means that an object of a single hue contains many colors of differing luminance. Colored light sources and reflections from nearby objects can result in a variation in hue of the colors of an object. Image degradations such as noise and blur can also create additional colors.

In the field of pattern recognition, different methods for clustering are known. An advantageous family of methods is based on the Expectation-Maximization (EM) method as applied to estimating a Gaussian mixture model. In this method, one starts with a given number of clusters. A corresponding number of data points are taken randomly as cluster means (centroid, center of gravity).

In the EM expectation step, for all data points, the conditional probability is determined that a data point arises from each cluster using a MAP (Maximum A Posteriori) principle. In the EM maximization step, the parameters of the clusters are re-estimated given the conditional probabilities of the data. These steps are repeated until the overall likelihood changes less than a predetermined threshold or after a predetermined number of iterations.

In the embodiment described above, clustering at step 202 is performed for a given number of clusters. However, usually this number is not known in advance. In view of this, step 202 can be repeated several times, each time with a different number of clusters, for example, starting with one or two clusters and repeating the step up to a predetermined maximum number of clusters.

At step 203, the optimal clustering is determined. In this step, the best number of clusters can be determined by several model selection methods including a Bayesian Information Criterion or a Universal Model-based Minimum Description Length Principle. Alternatively or additionally, other criteria such as the Integrated Completed Likelihood (ICL), the Normalized Entropy Criterion (NEC), or the cross-validation criterion (CV) can be used for model selection. In one alternate embodiment at 203, a user may determine the optimal number of clusters. In yet another embodiment at 203, the optimal number of clusters may be a predefined fixed number of clusters.

Figure 3:
FIGS. 3 illustrates an example background image.
Figure 4:
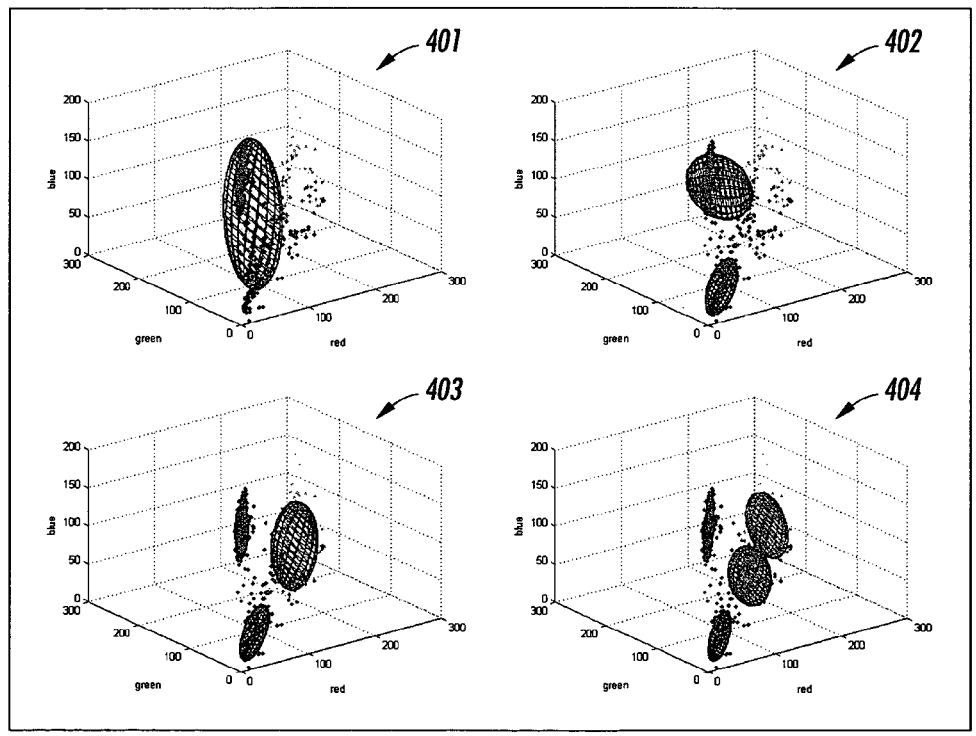
FIG. 4 illustrates an example of clustering the pixels of the background image shown in FIG. 3.

An example of Expectation-Maximization clustering for one to four clusters is shown in FIG. 4 for an example image shown in FIG. 3. For this example of Expectation-Maximization clustering, the example image shown in FIG. 3 represents a background image comprised of a red fox on a blue background. More specifically, FIG. 4 shows the data points in color space (RGB) with the results of Expectation-Maximization clustering for one cluster at 401, two clusters at 402, three clusters at 403, and four clusters at 404. The ellipsoids shown in FIG. 4 are the 50% probability ellipsoids of the corresponding Gaussian distribution.

Continuing with step 204, image segmentation is performed. In this step, each area of the whole image or a part of the image (depending on whether the color clustering was performed for the whole image or only a part of it) is assigned a cluster label in order to determine the local colors of the image 111. In particular, the goal at 204 is to label each pixel such that the fit of the pixel to the label is high and the piecewise smoothness of the region is preserved. Different methods are possible for carrying out image segmentation at 204.

A first embodiment for performing image segmentation is based on a normalized cut criterion. This method is described, for example, in J. Shi and J. Malik, "Normalized Cuts and Image Segmentation", IEEE Transactions on Pattern Analysis and Machine Intelligence 22, 888-905 (2000), which is incorporated herein by reference. Further alternatives are region-growing, region-splitting, or energy-minimization methods. Additionally, other methods of image segmentation known in the art may be used as will be appreciated by those skilled in the art, some of which are disclosed in the following publications, which are all incorporated herein by reference: K. S. Fu and J. K. Mui, "A Survey On Image Segmentation", Pattern Recognition, vol. 13, pp. 3-16, 1981; R. M. Haralick, "Image Segmentation Survey", in Fundamentals in Computer Vision, O. D. Faugeras (ed.), pp. 209-224, Cambridge University Press, Cambridge, 1983; R. M. Haralick and L. G. Shapiro, "Survey—Image Segmentation Techniques", Computer Vision Graphics and Image Processing, vol. 29, pp. 100-132, 1985; N. R. Pal and S. K. Pal, "A Review On Image Segmentation Techniques", Pattern Recognition, vol. 26, pp. 1277-1294, 1993; and P. K. Sahoo, S. Soltani, A. K. C. Wong and Y. C. Chen, "A Survey Of Thresholding Techniques", Computer Vision, Graphics and Image Processing, vol. 41, pp. 233-260, 1988.

Figure 5:
FIGS. 5 and 6 illustrate an example results of segmenting the image shown in FIG. 3.
Figure 6:

As an example, image segmentation was performed for the image shown in FIG. 3. For this image, Expectation-Maximization clustering with three clusters at 403 (as shown in FIG. 4) yields the best result according to model selection. Image segmentation was performed using the best result according to model selection. Thus, image segmentation was performed using a graph cut method and the three cluster Expectation-Maximization model. The result of this segmentation is shown in FIGS. 5 and 6, in which FIG. 5 shows a first segmented portion of the image in FIG. 3 (which is made up of one of the three clusters at 403) and FIG. 6 shows a second segmented portion of the image in FIG. 3 (which is made up of two of the three clusters at 403).

Returning to FIG. 2, the method continues with the cluster grouping of step 205. In order to perform this step 205, a selected region or candidate region is to be provided where a foreground object is to be placed. This region should be large enough to contain the foreground object and possibly include an amount of padding around the foreground object. Then at 205, the color clusters are divided into two sets: the clusters which have regions that overlap with the foreground region (i.e., interference clusters) and the clusters which do not have regions overlapping with the foreground region (i.e., benign clusters). It may happen that all clusters are interference clusters.

In alternate embodiments, the grouping of clusters performed at 205 may be performed without first segmenting the image at step 204. Thus in an alternate embodiment, colors may be grouped at 205, for example, by labeling pixels with a most likely cluster and finding the most frequently occurring label. In another embodiment, grouping is optional at 202, for example, by considering all clusters as interference clusters.

Figure 7:
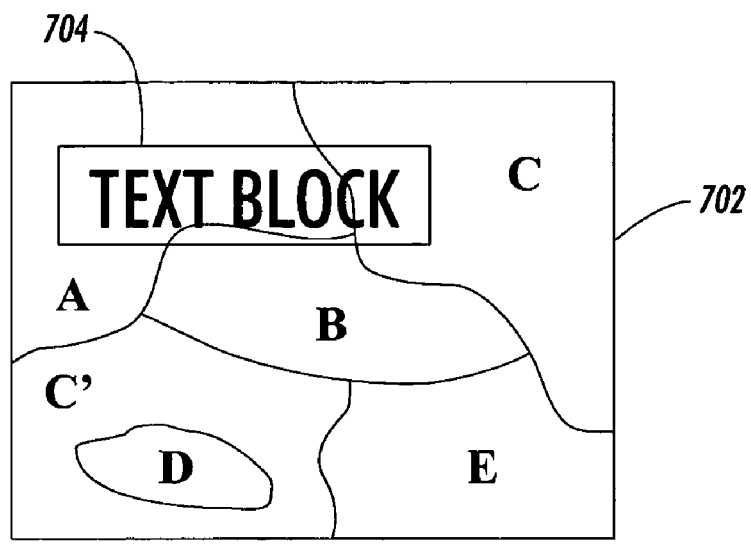
FIG. 7 illustrates interference and benign color clusters for a foreground block 704 that intersects a background image segment.

FIG. 7 illustrates interference and benign color clusters for a foreground text or graphics block candidate region 704 that intersects a background image segment 702. Color clusters with segments A, B, C of the image 702 that overlap with the text block 704 are interference clusters. Color clusters with segments D and E of the image 702 that do not overlap with the text block 704 are benign clusters. However, since segment C' of the image 702 is associated with the same color cluster as the image segment C, the image segment C' is treated as an interference cluster even though it does not overlap with the text block 704.

Continuing at step 207 with the image data clustered into a set of interference and benign clusters, a design function (or method) is evaluated to recommend a foreground color for the candidate background region, the details and embodiments of which are discussed below. The design function (and method) is based on one or more predetermined criteria.

If an acceptable or a superior candidate background color is identified at 208, the system may automatically combine image data with foreground text and/or graphics object having the recommended color to produce output a single image or an overlaid image (e.g., text and/or graphics overlaying the background image) at 209. If no acceptable or superior result is identified at 208, the user may be presented at 210 with alternatives to foreground colors to evaluate, and a selection requested at 211. The presentation at 210 may include either alternative foreground color recommendations and/or examples of the background image overlaid with the foreground text and/or graphics object having the recommended color.

Figure 8:
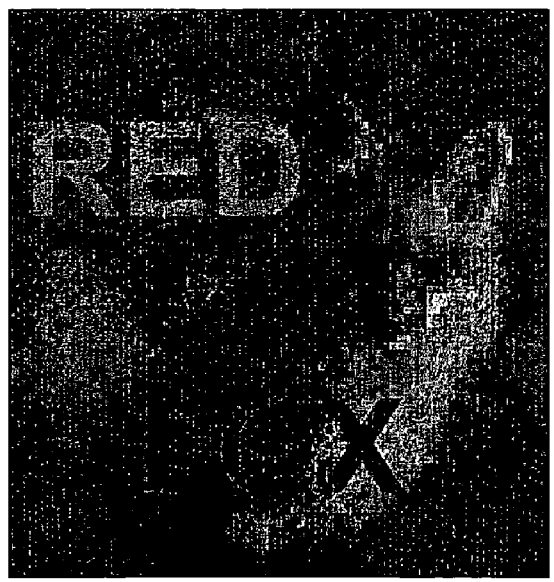
FIG. 8 illustrates an example of the background image shown in FIG. 3 displayed together with foreground regions.

It is to be understood that the method set forth in FIG. 2 need not be performed for a single foreground region, but can be used for several foreground regions of an image as well. In such a way, it is possible to place more than one text or graphics object on a background image or to provide alternative regions with corresponding color recommendations for a single text or graphics object. For example, FIG. 8 illustrates the background image in FIG. 3 in which two foreground texts, "RED" and "FOX", are provided to the system as foreground text to be placed on segmented portions of the background image shown in FIGS. 5 and 6, respectively. In this example, the system determines the recommended color for the foreground texts "RED" and "FOX" are red-orange and blue, respectively, which are in two different regions of the image.

Furthermore, additional properties of the background image can be used in order to identify placement of the text or graphics forming part of the foreground image on the background. For example, the scale and variance of the texture of the background image may play a role in the scale chosen for foreground text of a certain size and semantic analysis of the background image might prohibit the placing of foreground text or graphics over human faces forming part of the background image.

With reference again to FIG. 1, in one embodiment steps 201, 202 and 203 set forth in FIG. 2 are performed in color clustering module 101, steps 204 and 205 are performed by image segmentation module 102, and the remaining steps set forth in FIG. 2 are performed by color selection module 103 and coalescing module 118. In this embodiment, the coalescing module 118 may receive as input foreground text and/or graphics (e.g., text "RED FOX") and the background image 111 (e.g., the image shown in FIG. 3) and output in addition to or in place of recommended color or colors 115, an output image that coalesces the background image 111 and the foreground text and/or graphics (e.g., the image in shown in FIG. 8).

B. Criteria For Determining Foreground Color

Referring again to evaluating a design function at 207 in FIG. 2, several embodiments for recommending or selecting a color for a candidate region of a background image are described below.

In a first embodiment for evaluating the design function at 207 according to one or more predetermined criteria, a legibility criterion is evaluated. In this embodiment, the legibility criterion is evaluated by: (A) computing local measures of contrast between background and foreground in a neighborhood of a candidate region of the background image; and subsequently (B) computing a legibility score representative of the lowest few contrast values observed over the candidate region.

In one embodiment, the lowest few contrast values observed over the candidate region is the minimum value of all local contrast measures taken over the entire candidate region. In another embodiment, the lowest few contrast values observed over the candidate region are those values in the tenth percentile of the contrast values taken over the entire candidate region. In yet another embodiment, the lowest few contrast values observed over the candidate region is an average those lowest contrast values in the lower quartile taken over the entire candidate region.

Generally in computing the local measures of contrast, the local contrasts are computed over a scale that is proportional to, for example, the foreground text size to determine an overall contrast. Subsequently, the overall contrast is then multiplied by a factor proportional to the foreground text size. The local measures are functions that decrease with increasing local background variation. The overall contrast score may be supplemented with additional factors such as the intrinsic legibility of a font.

Specifically in taking the local measures of contrast, one embodiment may involve the following steps: (a) downsample a region of the image containing the text so that uppercase text is approximately thirty pixels high; (b) derive normalized versions of the color channels by dividing the red and blue channels by two; (c) compute Gaussian weighted averages of the background pixels and the foreground pixels over the image, where the Gaussian width is two; (d) compute local variances of the Gaussian weighted averages, where variance is computed over a window of size of sixty pixels; (e) estimate the sums of the variances of all three color channels; (f) compute a first contrast measure as the squared difference between local mean foreground and local mean background colors, divided by the variance estimate; (g) compute a second contrast measure by dilating (i.e., taking local maxima of) the first contrast measure with a square structuring element (e.g., nine-by-nine pixels); (h) compute the output contrast measure by multiplying the second contrast measure by the text height.

Advantageously, this first embodiment for recommending the foreground color using a legibility criterion is adapted to handle multi-color background images and foreground text and/or graphics. A further advantage of this first embodiment for recommending the foreground color using a legibility criterion is that it has been found experimentally to produce legibility comparisons that are in good agreement with human perception.

Further it will be appreciated that many other uses of this method for determining the legibility of an image may be made in addition to recommending and/or selecting a foreground color for an image, such as: (a) to proof an existing layout for legibility; (b) to select the position of placement of text given a text color and the image; (c) to select a size of text of a given text color and the image; (d) to select the image from a set of alternative images on which to place text, given the text color; (e) to select a "screen" (i.e., region of reduced background contrast) or direction in which to desaturate the image (e.g., a sepia tone), given the text color.

According to this method for determining the legibility of an image, a design function may be defined to use the following legibility criterion to recommend the foreground color. The legibility criterion is based on a likelihood ratio for two models (a) that the image I contains text T and (b) that the image I just contains background B, which may be given by:

$$\text{score}(T) = h \log \frac{Pr(I|T)}{Pr(I|B)}.$$

Under the assumption of independent pixels, the sum over the parts of the image I that contains text T which are foreground according to the text model may be given by:

$$\text{score}(T) = \sum_{x \in T} r(x), \text{ with } r(x) = h \log \frac{Pr(I(x)|T)}{Pr(I(x)|B)},$$

where h is a number representative of the size of size T, for instance, the baseline height in pixels. Pr(I(x)|T) denotes heuristic or other models of likelihoods that the image I contains text T at a given pixel x and Pr(I(x)|B) denotes heuristic or other models of likelihoods that the image I contains background B at the given pixel x.

The metric of for legibility is the difference in score to the so-called closest incorrect text T' as given by:

$$\text{legibility} = \text{score}(T) - \max_{T' \neq T} \text{score}(T'),$$

wherein for generating an incorrect text T', it is prescribed that it is sufficient for the image of the text to change from foreground to background over a small disc (e.g., enough to change an "e" to a "c"). Then, legibility reduces to $$\text{legibility} = \min_{x \in T} \max_{y \in C_\varepsilon^2} r(x+y),$$

wherein $C_\varepsilon^2$ is a small disc (with radius $\varepsilon$.

Particularly, a Gaussian model can be taken for each point of the image with equal variance for each color coordinate, but with different means F and B for foreground and background. Then, each term of the score may be given by:

$$r = \frac{\|F-B\|^2}{\sigma^2} = \frac{\sum_c (F_c - B_c)^2}{\sum_c \sigma_c^2}.$$

The means F and B and the variance $\sigma^2$ of the background are estimated by taking local averages of foreground and background in the composite image (at the same scale as the "small disc"). For instance, using a Gaussian windowing function $G_\varepsilon(u)$ on the composite image I with text region T and non-text region $\overline{T}$ one can take:

$$F_c(x) = \frac{\sum_{\text{pixels } u \in T} I_c(u) G_\varepsilon(x-u)}{\sum_{\text{pixels } u \in T} G_\varepsilon(x-u)} \text{ and}$$

$$B_c(x) = \frac{\sum_{\text{pixels } u \in \overline{T}} I_c(u) G_\varepsilon(x-u)}{\sum_{\text{pixels } u \in \overline{T}} G_\varepsilon(x-u)}.$$

In a second embodiment for evaluating the design function at 207 according to one or more predetermined criteria, a color harmony criterion is evaluated. In this embodiment, a color harmony function is defined for recommending a foreground color with respect to one or more interference clusters and/or benign clusters. The color harmony function can have a form so as to fulfill a predetermined design principle such as: the distance to one of the benign clusters is small (repetition of elements); or a color harmony principle such as the color lies along a line in RGB space which joins the origin and the center of one of the interference clusters (i.e., monotonic color harmony); the color is nearly opposite in hue to a specific color cluster (e.g., a major cluster comprising a majority of the pixels), either interference or benign (complementary color harmony); the color's hue and the hue of other clusters divide the color wheel into equal increments (e.g., triadic and quadric color harmony). The color harmony function can take the value 1 if a color adheres to a specific color model and 0 if not. For example, if $c = kq_i$ where $q_i \in Q_i$ is the color of a benign cluster $Q_i$, then the value of the corresponding color harmony function is $h_{mono}(c, Q_i) = 1$.

In evaluating the design function at 207 according to one or more predetermined criteria, other design criteria and/or combinations of such design criteria including color harmony and legibility may be used as well which could be based on, for example, traditional design principles, physiological phenomena, cognitive experiment data, or machine-learned relationships from examples given to the system. According to one alternative embodiment, a color harmony criterion and a legibility criterion can be applied together to select a foreground color. Ideally in these embodiments, the recommended foreground color at 207 should fall into a section in color space which is sufficiently far away from all interference clusters such that it is legible but, preferably, related to at least one of the interference clusters in a way which is harmonious.

Figure 9:
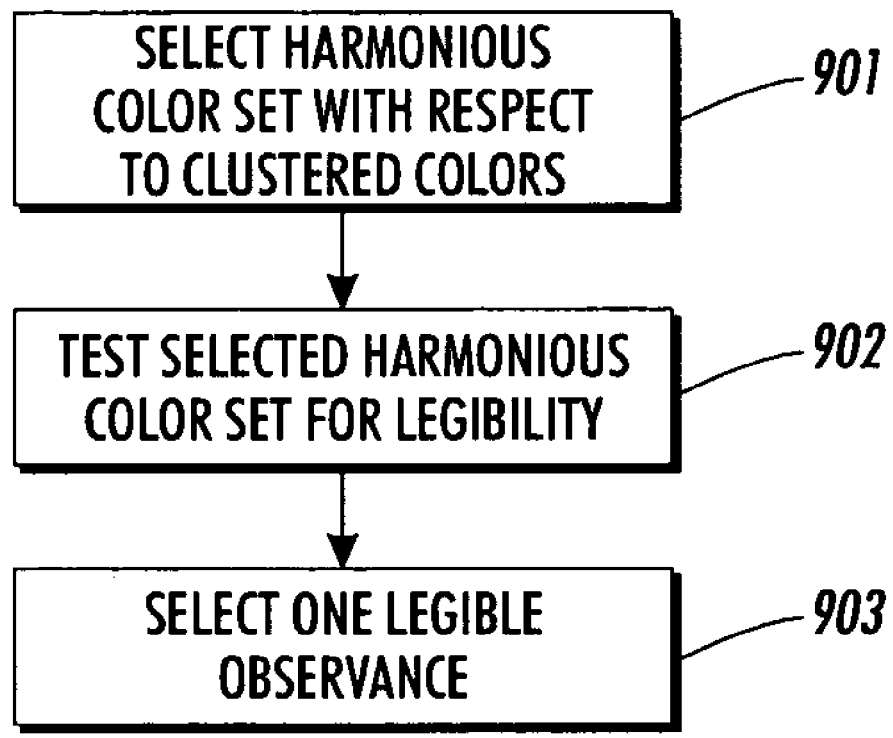
FIG. 9 is a flow diagram illustrating a method for recommending a color for foreground of a background region of an image.

In a third embodiment for evaluating the design function at 207, a combination of color harmony and legibility criteria is used in a design method to recommend a color for a candidate region, for which a flow diagram is shown in FIG. 9. The design method involves initially selecting, at 901, a harmonious color set with respect to clustered colors of the background image using a color harmony function, as described in more detail above. Subsequently, the harmonious color set (i.e., a subset of the clustered colors) is tested using a legibility function at 902 from which one or more colors are selected for recommendation at 903.

In an example embodiment combining the evaluation of color harmony and legibility criteria, the harmonious color set may be selected (as shown in FIG. 9 at 901) by determining a subspace (set of colors) of the color space where a given color model (e.g., monotonic, triadic, etc.) is valid. In this way, a large number of colors can already be eliminated. It is even possible to sub-sample this subspace to further reduce the number of possible candidate colors. Then at 902 in FIG. 9, after determining a subspace of the color space, the maximum (or a value sufficiently large) of the legibility function is determined for the colors of this subspace.

There might not necessarily be a unique maximum of the legibility function. One can try to solve this problem by searching for the maximum of the legibility function over several color harmony models. Alternatively or additionally (if there is still no unique maximum), it may be tested for example at step 208 (shown in FIG. 2) whether the resulting maximum is actually unique. If yes, the method would proceed to step 209 where the background image is output (e.g., displayed, printed, transmitted, etc.) together with a foreground text or graphics that has been provided to the system. If the maximum is not unique, the possible maxima can be presented to a user at step 210. In a following step 211, then, the user can be requested to select a color among the suggestions from the system. Otherwise, the maxima can be chosen randomly or by another criterion.

In a fourth embodiment for evaluating the design function at 207, a combination of color harmony and legibility criteria are maximized in a linear design function to produce, a recommended color. One possible form of the linear design function may be defined as:

$$\sum_{i=1}^{M} \alpha_i l(c, P_i) + \sum_{k=1}^{N} \gamma_k h(c, K_k)$$

where $P_i$ denote the interference clusters, $K_k$ denotes all clusters, both benign and interference, l is a legibility function in color space, h is a color harmony function, and $\alpha_i$ and $\gamma_k$ are weighting factors.

The legibility and color harmony functions forming part of the linear design function can themselves be combinations of other functions. The color harmony and legibility functions can have a form as described above, in particular, with predetermined weightings of the coordinates in color space such as a higher weighting of the luminance than hue or saturation.

C. Miscellaneous

The configuration of the described system 100 is intended to be modular in nature so that it can be combined with other document quality measures and integrated into a larger document layout system.

Using the foregoing specification, the invention may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments of the invention. As such, alternative ordering of the steps, performing one or more steps in parallel, and/or performing additional or fewer steps may be done in alternative embodiments of the invention.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method for automatically determining a foreground color for a digital image, comprising:
   (a) automatically dividing the colors of the pixels of at least a part of the digital image into a number of color clusters in a color space;
   (b) automatically segmenting the part of the digital image into regions according to the color clusters;
   (c) automatically grouping the color clusters into interference clusters comprising a pixel in a selected region of the image and benign clusters comprising no pixel in the selected region;
   (d) automatically selecting a foreground color being related to at least one interference cluster according to predetermined criteria and the foreground color being selected according to a color harmony criterion with respect to at least one benign cluster; and
   (e) one of automatically displaying, storing and communicating data representing the selected foreground color.

2. The method according to claim 1, wherein said selecting at (d) further comprises:
   selecting a harmonious color set with respect to the color clusters; and
   testing the harmonious color set for legibility.

3. The method according to claim 2, wherein said testing the harmonious color set for legibility further comprises:
   computing local measures of contrast between a background and the foreground in a neighborhood of a predetermined foreground region; and
   computing a legibility score representative of a lowest few contrast values observed over the predetermined foreground region.

4. The method according to claim 2, wherein the foreground color is selected according to a legibility criterion for a predetermined foreground region by:
   computing local measures of contrast between background and foreground in a neighborhood for a predetermined foreground region; and
   computing a legibility score representative of a lowest few contrast values observed over the predetermined foreground region.

5. The method according to claim 1, wherein said dividing at (a) comprises converting the image data to a predetermined color format.

6. The method according to claim 1, wherein said dividing at (a) comprises using an Expectation-Maximization clustering.

7. The method according to claim 1, wherein said dividing at (a) comprises determining the number of clusters using a model selection method one of a Bayesian Information Criterion and a Universal Model-based Minimum Description Length Principle.

8. The method according to claim 1, wherein the segmenting comprises using one of a normalized cut criterion and an energy-minimization method.

9. The method according to claim 1, wherein the foreground color is selected according to a legibility criterion for a predetermined foreground region.

10. The method according to claim 9, wherein the foreground color is selected based on a likelihood ratio of the hypothesis that the digital image contains the foreground region and the hypothesis that the digital image does not contain the foreground region.

11. The method according claim 10, wherein selecting the foreground color comprises computing the legibility of $$\min_{x \in T} \max_{y \in C_\epsilon^2} r(x+y),$$

wherein $$r(x) = h \log \frac{Pr(I(x)|T)}{Pr(I(x)|B)},$$

$C_\epsilon^2$ is a disc of radius $\epsilon$ and wherein $Pr(i(x)|T)$ denotes heuristic or other models of likelihoods that the image I contains text T at a given pixel x and $Pr(J(x)|B)$ denotes heuristic or other models of likelihoods that the image I contains background B at the given pixel x.

12. The method according to claim 1, wherein the foreground color is selected according to at least one of a monotonic, a complementary, and a p-adic color harmony criterion in HSL space.

13. The method according to claim 1, wherein the foreground color is selected according to a color harmony criterion with respect to at least one interference cluster.

14. The method according to claim 1, wherein the foreground color is selected according to a color harmony criterion with respect to all interference clusters and at least one benign cluster.

15. The method according to claim 1, wherein said selecting at (d) comprises determining a color subset according to a color harmony criterion and maximizing a legibility function in the color subset.

16. The method according to claim 1, wherein the foreground color is selected for which $$\sum_{i=1}^{M} \alpha_i l(c, P_i) + \sum_{k=1}^{N} \gamma_k h(c, K_k)$$

is maximal, wherein c denotes the foreground color, $P_i$ denote the interference clusters, $K_k$ denote all clusters, both benign and interference, l is a legibility function in color space, h is a color harmony function, and $\alpha_i$ and $\gamma_k$ are weighting factors.

17. The method according to claim 1, further comprising one of displaying and storing a predetermined object using the selected foreground color together with the digital image.

18. An apparatus for automatically determining a foreground color for a digital image comprising:
a processor which executes computer readable instructions, stored in a memory, to perform the method comprising:
(a) automatically dividing the colors of the pixels of at least a part of the digital image into a number of color clusters in a color space;
(b) automatically segmenting the part of the digital image into regions according to the color clusters;
(c) automatically grouping the color clusters into interference clusters comprising a pixel in a selected region of the image and benign clusters comprising no pixel in the selected region;
(d) automatically selecting a foreground color being related to at least one interference cluster according to predetermined criteria and the foreground color being selected according to a color harmony criterion with respect to at least one benign cluster; and
(e) one of automatically displaying, storing and communicating data representing the selected foreground color.

19. The apparatus according to claim 18, wherein said selecting at (d) further comprises:
selecting a harmonious color set with respect to the color clusters; and
testing the harmonious color set for legibility.

20. The apparatus according to claim 19, wherein said testing the harmonious color set for legibility further comprises:
computing local measures of contrast between background and foreground in a neighborhood of a predetermined foreground region; and
computing a legibility score representative of a lowest few contrast values observed over the predetermined foreground region.

21. A computer program product comprising:
a computer-usable memory device storing instructions that, when executed by a computer, cause the computer to perform a method comprising:
(a) automatically dividing the colors of the pixels of at least a part of the digital image into a number of color clusters in a color space;
(b) automatically segmenting the part of the digital image into regions according to the color clusters;
(c) automatically grouping the color clusters into interference clusters comprising a pixel in a selected region of the image and benign clusters comprising no pixel in the selected region;
(d) automatically selecting a foreground color being related to at least one interference cluster according to predetermined criteria and the foreground color being selected according to a color harmony criterion with respect to at least one benign cluster; and
(e) one of automatically displaying, storing and communicating data representing the selected foreground color.

22. The computer program product according to claim 21, wherein said selecting at (d) further comprises:
selecting a harmonious color set with respect to the color clusters; and
testing the harmonious color set for legibility.

23. The computer program product according to claim 22, wherein said testing the harmonious color set for legibility further comprises:
computing local measures of contrast between background and foreground in a neighborhood of a predetermined foreground region; and
computing a legibility score representative of a lowest few contrast values observed over the predetermined foreground region.

* * * * *